No. 754,909. PATENTED MAR. 15, 1904.
T. H. SPRINGER.
CENTRIFUGAL LIQUID SEPARATOR.
APPLICATION FILED JUNE 1, 1903.
NO MODEL.
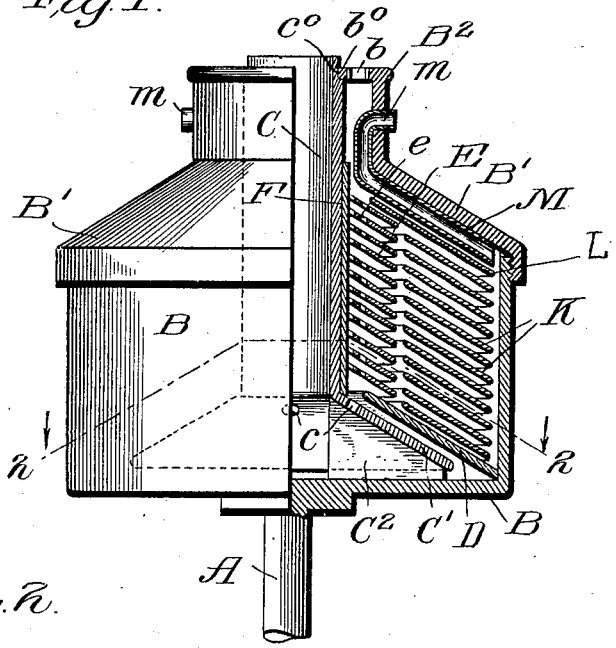
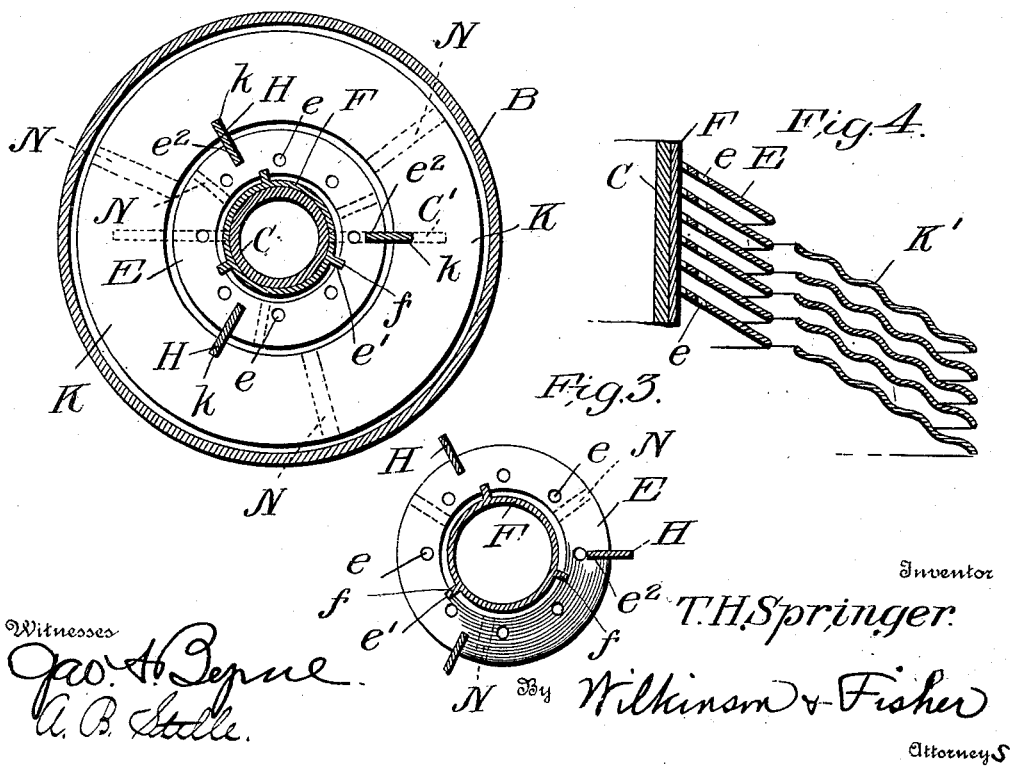

No. 754,909. Patented March 15, 1904.

UNITED STATES PATENT OFFICE.

THOMAS H. SPRINGER, OF WASHINGTON, DISTRICT OF COLUMBIA.

CENTRIFUGAL LIQUID-SEPARATOR.

SPECIFICATION forming part of Letters Patent No. 754,909, dated March 15, 1904.

Application filed June 1, 1903. Serial No. 159,658. (No model.)

*To all whom it may concern:*

Be it known that I, THOMAS HENRY SPRINGER, a citizen of the United States, residing at Washington, in the District of Columbia, have invented certain new and useful Improvements in Centrifugal Liquid-Separators; and I do hereby declare the following to be a full, clear, and exact description of the invention, such as will enable others skilled in the art to which it appertains to make and use the same.

My invention relates to improvements in centrifugal liquid-separators; and it consists of certain novel features that will be hereinafter described and claimed.

Reference is had to the accompanying drawings, in which the same parts are indicated by the same letters throughout the several views.

Figure 1 is a side elevation, partly in section, of the improved separator. Fig. 2 represents a section along the broken line 2 2 of Fig. 1 and looking down. Fig. 3 is a detail showing the inner disks removed, and Fig. 4 is a detail showing a modification in the shape of the outer separating-disks.

A represents the spindle, which is driven in any suitable way. This spindle carries the bowl B, having the cone-shaped top B′ secured thereto and terminating in the neck $B^2$, provided with an escape-outlet $b$ for the cream at the top thereof.

C represents the central tube or feed-tube, in which the whole milk is inserted, which is provided with a cone-shaped bottom C′, the lower edge of which is raised slightly above the bottom of the bowl, so as to permit the free passage of the milk beneath the lower edge of said cone. A plurality of holes $c$ are provided near the top of the cone as a passage for the partly-separated milk or cream. Two or more vanes $C^2$ project from the bottom of the cone C′ and prevent the milk from having a vortical motion in said cone.

Just above the cone and spaced therefrom is a conical deflector D, which rests on the bottom of the bowl and provides a continuous passage between it and said cone for the milk, which is thrown outward by the vanes C, which milk passes upward beneath the inclined disks E. These disks are slipped on over the sleeve F and are notched, as at $e'$, to engage the ribs $f$, projecting from said sleeve F. The disks E are preferably soldered to the sleeve F and to the posts H, and thus, with said sleeve and posts, form a frame which may be put in place and removed as a single piece. This sleeve slips over the central tube C and rests on the top of the cone C′, as indicated in Fig. 1. These disks E are perforated, as at $e$, to permit the passage therethrough of the cream, which thus rises vertically near the axis of the separator, the lighter cream rising and the heavier particles of milk being thrown outward and downward from the disks E. There are a plurality of posts H, which engage in notches $e^2$ in the disks E and also in notches $k$ in the outer disks K, which disks are also inclined downward. There is a short space between the inner series of disks E and the outer series of disks K, which allows the cream to pass upward therethrough, and the skim-milk is thrown downward and outward by the disks, finally rising in the annular passage exterior to the disks K and passes up through the tubes M and openings $m$ to any suitable trough, whence it is carried off. The disks E and K are spaced apart by any suitable spacers, such as strips of tin N, soldered to said disks. In the drawings the distance between contiguous disks is exaggerated for the sake of clearness.

The operation of the device is as follows: The whole milk is poured into the central tube C and is thrown out centrifugally by the vanes $C^2$, part of the cream and some of the milk with it rising through the opening $c$. The rest of the milk passes under the edge of the cone $c^2$, thence upward beneath the lower face of the cone D, and up beneath the series of disks E. Here the heavier milk is thrown outward and downward, and the lighter cream is gradually separated near the axis of the machine until the separated cream passes off through the opening $b$ and the heavier skim-milk is thrown out through the outlets $m$.

It will be seen that the parts may be very readily assembled and separated for cleansing, repairs, and the like. Thus the central tube C, carrying the vanes $C^2$, is set down in the bowl. The conical deflector D is then put in. The sleeve F is then slipped on over the tube C, carrying the disks E and the posts H.

The disks K are put in place, then the plate L, and finally the cap B' is screwed on its inner edge $b^0$, resting in a notch $c^0$ on the tube C. To take the machine apart, reverse the operation.

In the modification shown in Fig. 4 the outer series of disks are made corrugated, as shown at K', so as to secure a better separation of the cream from the milk.

Having thus described my invention, what I claim, and desire to secure by Letters Patent of the United States, is—

1. In a centrifugal liquid-separator, the combination with a bowl having a cylindrical bottom portion, a conical cap screwed thereon, the said cap being provided with a cylindrical neck with an opening in the top thereof for the cream, of a tube for the whole milk mounted in the center of said bowl and terminating in an enlarged conical portion, with vanes projecting from said conical portion and spacing the same above the bottom of the bowl, a conical deflector mounted in said bowl above the conical portion of said tube but spaced therefrom, a double series of downwardly-inclined concentric deflecting-disks mounted in said bowl above said conical deflector, the inner series of disks being provided with vertical openings near the central tube, and a plurality of bent pipes leading from the interior of said bowl near the outer periphery of the outer disks and opening outward through the neck of said bowl, substantially as described.

2. In a centrifugal liquid-separator, the combination with a bowl having a cylindrical bottom portion, a conical cap screwed thereon, the said cap being provided with a cylindrical neck with an opening in the top thereof for the cream, of a tube for the whole milk mounted in the center of said bowl and terminating in an enlarged conical portion, vanes spaced above the bottom of the bowl, a conical deflector mounted in said bowl above the conical portion of said tube but spaced therefrom, a series of downwardly-inclined deflecting-disks mounted in said bowl above said conical deflector and provided with vertical openings near the central tube, and a plurality of bent pipes leading from the interior of said bowl near the outer periphery of said disks and opening outward through the neck of said bowl, substantially as described.

3. In a centrifugal liquid-separator, the combination with a bowl having a cylindrical bottom portion, a conical cap screwed thereon, the said cap being provided with a cylindrical neck with an opening in the top thereof for the cream, of a tube for the whole milk mounted in the center of said bowl and terminating in an enlarged conical portion, with vanes projecting from said conical portion and spacing the same above the bottom of the bowl, a conical deflector mounted in said bowl above the conical portion of said tube but spaced therefrom, a sleeve mounted on said tube, a series of downwardly-inclined deflecting-disks secured to said sleeve and provided with vertical openings near the central tube, a second series of deflecting-disks concentric with but exterior to the first series, and a plurality of bent pipes leading from the interior of said bowl near the outer periphery of said disks and opening outward through the neck of said bowl, substantially as described.

4. In a centrifugal liquid-separator, the combination with a bowl having a cylindrical bottom portion, a conical cap screwed thereon, the said cap being provided with a cylindrical neck with openings in the top thereof for the cream, of a feed-tube for the whole milk mounted in the center of said bowl and terminating in an enlarged conical portion, vanes projecting from said conical portion and spacing the same above the bottom of the bowl, a conical deflector mounted in said bowl above the conical portion of said tube but spaced therefrom, a series of downwardly-inclined deflecting-disks mounted in said bowl above said conical deflector and provided with vertical openings near the central tube, and a plurality of bent pipes leading from the interior of said bowl near the outer periphery of said disks and opening outward through the neck of said cap, substantially as described.

5. In a centrifugal liquid-separator, the combination with a bowl having a cylindrical bottom portion, a conical cap screwed thereon, the said cap being provided with a cylindrical neck with an opening in the top thereof for the cream, of a tube for the whole milk mounted in the center of said bowl and terminating in an enlarged conical portion, with vanes projecting from said conical portion and spacing the same above the bottom of the bowl, a sleeve mounted on said tube, a series of downwardly-inclined deflecting-disks secured to said sleeve and provided with vertical openings near the central tube, a second series of deflecting-disks concentric with but exterior to the first series, and a plurality of bent pipes leading from the interior of said bowl near the outer periphery of said disks and opening outward through the neck of said bowl, substantially as described.

In testimony whereof I affix my signature in presence of two witnesses.

THOMAS H. SPRINGER.

Witnesses:
FRANK D. BLACKISTONE,
A. B. STELLE.